United States Patent

[11] 3,568,067

[72] Inventor Jerry G. Williford
Tustin, Calif.
[21] Appl. No. 833,031
[22] Filed June 13, 1969
[45] Patented Mar. 2, 1971
[73] Assignee Collins Radio Company
Cedar Rapids, Iowa

[54] FREQUENCY DISCRIMINATOR WITH OUTPUT INDICATIVE OF DIFFERENCE BETWEEN INPUT AND LOCAL REFERENCE SIGNALS
5 Claims, 2 Drawing Figs.

[52] U.S. Cl. .......... 325/320, 325/349, 325/487, 329/124, 328/134, 178/66
[51] Int. Cl. .......... H04l 27/14, H03d 3/02
[50] Field of Search .......... 325/320, 349, 487, (Inquired); 329/50, 110, 122, 124, (Inquired); 328/133, 134; 178/66, 88

[56] References Cited

UNITED STATES PATENTS

| | | | |
|---|---|---|---|
| 3,500,217 | 3/1970 | Allen | 329/50 |
| 3,439,283 | 4/1969 | Danielson | 325/320 |
| 3,409,838 | 11/1968 | McLeod, Jr. | 325/320 |
| 2,924,706 | 2/1960 | Sassler | 329/50 |

*Primary Examiner*—Robert L. Griffin
*Assistant Examiner*—James A. Brodsky
*Attorney*—D. W. Phillion

ABSTRACT: A first means extracts the difference frequency components of the input signal ($f_{in}$) and a first reference signal ($F_r$). A second means extracts the difference frequency components of said input signal and a second reference signal in phase quadrature with the first reference signal. The two difference frequency signals are separately differentiated. Then the output from each of the two differentiators is multiplied by the input to the other differentiator to provide two output signals. A difference amplifier takes the difference between these two output signals to provide a signal in accordance with the expression $$\frac{d\theta}{dt} = (W_{in} - W_r)$$

where $d\theta/dt$ is the rate of change of phase between the input signal and the reference signal.

INVENTOR.
JERRY G. WILLIFORD
BY Donald W. Phillips
ATTORNEY

FREQUENCY DISCRIMINATOR WITH OUTPUT INDICATIVE OF DIFFERENCE BETWEEN INPUT AND LOCAL REFERENCE SIGNALS

This invention relates generally to frequency discriminators and more particularly to a frequency discriminator which does not employ a tuned circuit to determine the nominal center operating frequency.

Most prior art phase and frequency discriminators employ some type of tuned circuit, frequently in conjunction with a transformer. The variation of the frequency of the received signal from a nominal center frequency is accomplished by detecting the phase shift of the received signal across a turned circuit which is tuned to the nominal center operating frequency of the discriminator. Typical of this type circuit are the well-known Foster-Seely frequency discriminator disclosed in U.S. Pat. No. 2,121,103 issued Jun. 21, 1938, and ratio detector-type circuits.

These types of phase and frequency discriminator circuits present difficulties due to the use of the tuned circuit and/or transformers, and other inductances. More specifically such circuits provide only a small band limiting capability and further experience some operating frequency instability caused by aging of the components and temperature variation.

An object of the present invention is a frequency discriminator whose operating frequency is not dependent upon a tuned circuit but rather is dependent upon a single clock frequency which can have any desired stability.

A second aim of the invention is a frequency discriminator whose operating frequency is dependent only upon a single clock frequency which frequency can be easily changed without changing the remaining circuit parameters.

A third purpose of the invention is a frequency discriminator in which band limiting is easily obtained through the use of low pass filters.

A fourth object of the invention is a frequency discriminator in which predetection filters are not required, as they are in many other types of frequency discriminators, since the frequency discriminator of the present invention employs low pass filters.

A fifth purpose of the invention is a frequency discriminator which can be used in a multiplex system having a plurality of orthogonally spaced tones, and which employs the same filter design for all channels of the system.

A sixth purpose of the invention is a frequency discriminator in which no transformers, inductors, or tuned circuits are employed.

A seventh aim of the invention is the improvement of frequency discriminators generally.

In accordance with one form of the invention an input signal is supplied to first and second channels where it is multiplied by the sine and the cosine functions, respectively, of a reference signal at the operating frequency, thereby creating sum and difference frequencies thereof in each channel. A low pass filter is provided in each channel which translates the lower sideband of the multiplied output signals to baseband frequency.

The outputs of 51 low pass filters represent $x$ and $y$ components of a rotating vector having a rotating angle $\theta$ which is equal to the arc tangent of $x/y$ and whose derivative is:

(1) $$\frac{d\theta}{dt}=\left(\frac{1}{x^2+y^2}\right)(xdy-ydx)$$

To physically determine $d\theta/dt$ there are provided first and second differentiators which differentiate the output of said first and second low pass filters. Third and fourth multipliers are provided to then multiply the outputs of the differentiators of said first and second channels, respectively, by the outputs of the low pass filters of said second and first channels to produce output signals $xdy$ and $ydx$, respectively. A differential amplifier is then provided to produce an output signal whose magnitude and polarity is indicative of the magnitude and polarity of the difference between the initial reference and input signals.

In accordance with a feature thereof the invention can be employed in a conventional manner to detect frequency modulated signals or, alternatively, it can be employed in the detection of frequency shift keyed signals (FSK) wherein a signal of a first frequency represents a mark and a signal of a second frequency represents a space. The sine and cosine function of the reference frequency is injected midway between the two frequencies representing marks and spaces and functions to translate, in both channels, whichever of said two frequencies is being received to baseband. At baseband the lower sideband thereof is passed through a low pass filter and the upper sideband is rejected. As discussed above, the two resultant signals are spaced-apart by 90° and form a rotating vector, the components of which are formed by the outputs of the two low pass filters in the two channels of the invention.

The above-mentioned and other objects and features of the invention will be more fully understood from the following detailed description thereof when read in conjunction with the drawings in which.

Figure 1:
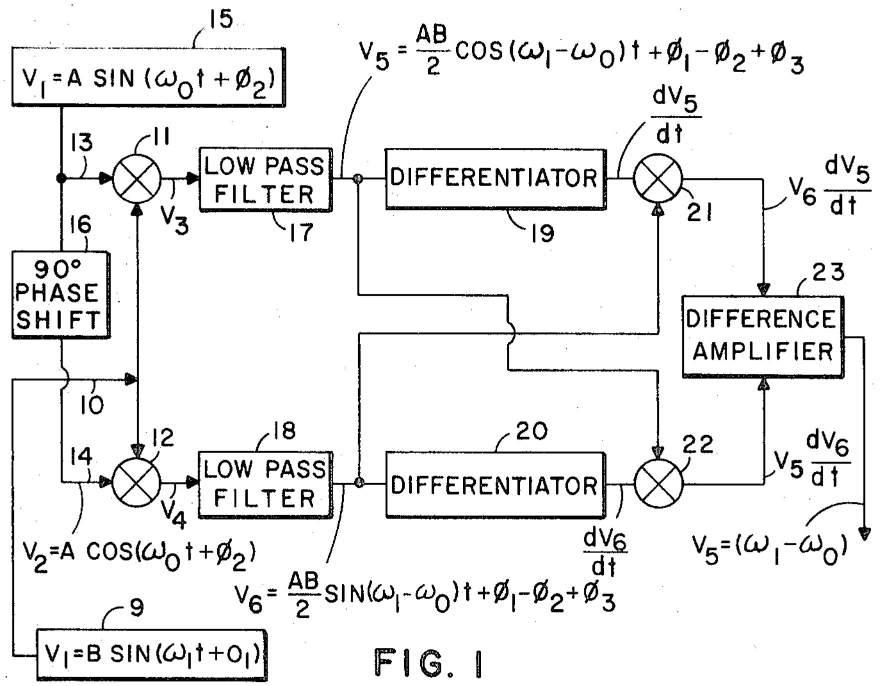
FIG. 1 is a block diagram of the invention.

Referring now to FIG. 1 the input signal $B \sin(\omega_1 t + \Phi_1)$ from source 9 is supplied via input lead 10 to multipliers 11 and 12. Also supplied to multipliers 11 and 12 are quadrature forms of the reference signal $V_1 = A \sin(\omega_o t + \Phi_2)$ on input leads 13 and 14, respectively.

More specifically the clock or reference signal $V_1$ is supplied directly to mixer 11 from source 15. Said clock signal is also supplied through 90° phase shifting means 16 to mixer 12. The outputs of the mixers 11 and 12 are designated as $V_3$ and $V_4$ in FIG. 1. The full expressions for $V_3$ and $V_4$ are as follows:

(2)
$$V_3=\frac{AB}{2}[\cos(\omega_1 t-\omega_0 t+\phi_1-\phi_2)-\cos(\omega_1 t+\omega_0 t+\phi_1+\phi_2)]$$

(3)
$$V_4=\frac{AB}{2}[\sin \omega_1 t-\omega_0 t+\phi_1-\phi_2)-\sin(\omega_0 t+\omega_1 t+\phi_2+\phi_1)]$$

Each of the above expressions 2 and 3 can be seen to contain the sum and difference frequencies of $\omega_1 t$ and $\omega_o t$. Both the sum and difference frequencies of expressions 2 and 3 are supplied respectively to low pass filters 17 and 18 which function to pass only the difference frequencies. These difference frequencies, which form the lower sidebands of $V_3$ and $V_4$ are designated generally as $V_5$ and $V_6$ at the outputs of low pass filters 17 and 18. The full expressions for $V_5$ and $V_6$ are show in FIG. 1 and are given below;

(4) $$V_5=\frac{AB}{2}\cos(\omega_1-\omega_0)t+\phi_1-\phi_2+\phi_3$$

(5) $$V_6=\frac{AB}{2}\sin(\omega_1-\omega_0)t+\phi_1-\phi_2+\phi_3$$

It can be seen from an examination of expressions 4 and 5 that one is a cosine function and the other is a sine function of the difference frequencies $(\omega_1 - \omega_o)t$, and that they are in quadrature and form the $x$ and $y$ projections of a rotating vector.

Since cosine $\theta$ equal cosine $(-\theta)$ and sin $\theta$ equal a negative sin $(-\theta)$, it can be seen that the direction of rotation of the vector depends upon whether the signal frequency $\omega_1$ is greater or less than the reference frequency $\omega_o$. The rate of rotation is the difference in frequency between $\omega_1$ and $\omega_o$.

It is apparent then from the foregoing that the relation of the frequency of the input signal and the frequency of the reference signal is a direct function of $d\theta./dt$.

The discriminator function $d\theta/dt$ is obtained in the following manner.

The The phase angle at any given instant is;

$$(6)\ \theta=\tan-1\ y/x$$

By taking the derivative of expression 6 we obtain;

$$(7)\qquad \frac{d\theta}{dt}=\frac{1}{\left(1+\frac{y^2}{x^2}\right)}\left(\frac{dy/dt}{x}-\frac{y\frac{dx}{dt}}{x^2}\right)$$

Then by multiplying through by $x2$ we obtain;

$$(8)\qquad \frac{d\theta}{dt}=\frac{1}{(x^2+y^2)}\left(xdy/dt-y\frac{dx}{dt}\right)$$

Then if:

$$(9)\ y=\sin(\omega_1-\omega_o)t$$

and $$(10)\ x=\cos(\omega_1-\omega_o)t$$

The expression for $d\theta/dt$ is as follows;

$$(11)\quad \frac{d\theta}{dt}=\frac{\cos(\omega_1-\omega_0)t\cdot(\omega_1-\omega_0)\ \cos(\omega_1-\omega_0)t}{[\sin^2(\omega_1-\omega_0)t+\cos^2(\omega_1-\omega_0)t]}+\frac{\sin(\omega_1-\omega_0)t\cdot(\omega_1-\omega_0)\ \sin(\omega_1-\omega_0)t}{[\sin^2(\omega_1-\omega_0)t+\cos^2(\omega_1-\omega_0)t]}$$

Combining terms and expression 11 there is obtained expression 12 as follows;

$$(12)\quad \frac{d\theta}{dt}=\frac{[\sin^2(\omega_1-\omega_0)t+\cos^2(\omega_1-\omega_0)t](\omega_1-\omega_0)}{[\sin^2(\omega_1-\omega_0)t+\cos^2(\omega_1-\omega_0)t]}$$

In expression 12 the two large terms in brackets in the denominator and in the numerator cancel out leaving the following expression;

$$(13)\qquad \frac{d\theta}{dt}=(\omega_1-\omega_0)$$

Thus it is seen that if the above operations defined by expressions 6 through 13 are carried out on the output signals of low pass filters 17 and 18, a signal is obtained whose sign depends upon whether $\omega_1$ is greater or less than $\omega_o$, and whose magnitude depends upon the difference frequency of $\omega_1$ and $\omega_o$. Such a signal, as defined by expression 13, appears at the output of difference amplifier 23.

The structure by which expressions 6 through 13 are carried out consists of differentiator 19 and 20, multipliers 21 and 22, and difference amplifier 23. The outputs of low pass filters 17 and 18 represent "$x$" and "$y$," respectively, in expressions 6 through 8. The output of differentiators 19 and 20 are represented by the expressions "$dx/dt$" and "$dy/dt$" of expression 7 and 8.

As is well known the differential of a sine function is that function times the cosine of that function and the differential of a cosine function is that function times the sine of said function, times a (−1). Thus the expression 11 is obtained from expression 8 by substituting the proper sine and cosine functions for the $x$ and $y$ functions of expression 8.

The multipliers 21 and 22 physically multiply the function $xdy$ and $ydx$ in expression 8 with the sine and cosine functions substituted for $x$ and $y$.

The difference between "$xdy$" and "$ydx$" of expression 8, and also the corresponding substituted sine and cosine functions of expressions 11 through 13, is physically implemented by difference amplifier 23 so that the output of said difference amplifier 23 is directly proportional to $\omega_1-\omega_o$.

Figure 2:
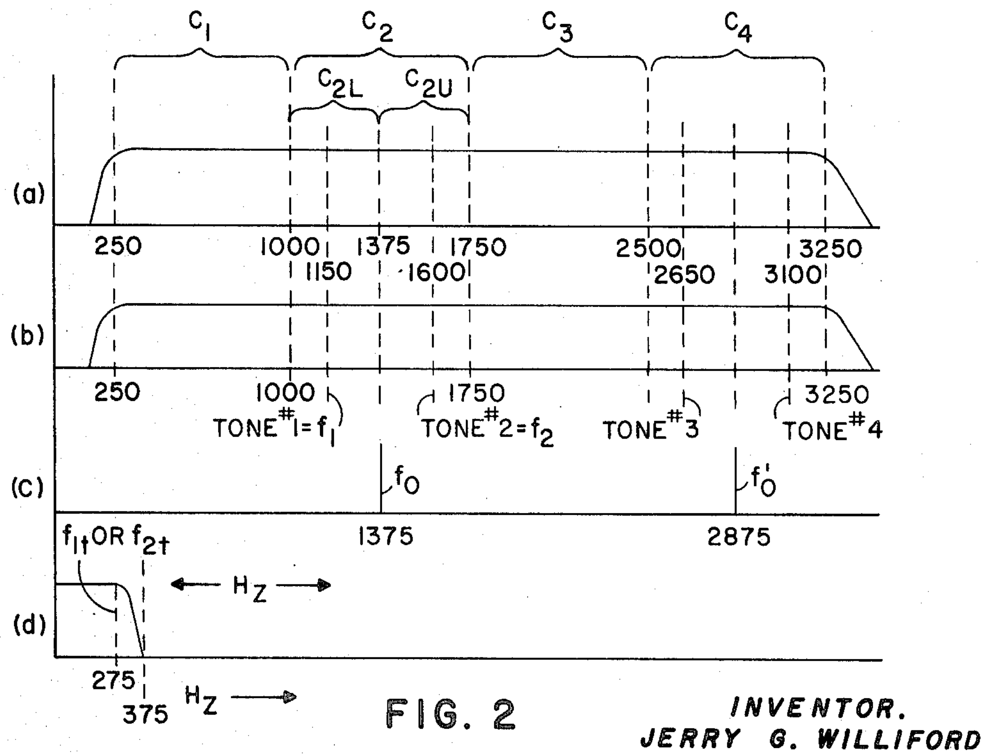
FIG. 2 is a set of frequency spectrum charts illustrating how the selected sidebands are transferred to baseband.

Referring now to the curve of FIG. 2 there is shown in FIGS. 2a and 2b a four channel frequency Spectrum. More specifically the frequency spectrum extends from 250 Hz. to 3,250 Hz. and is divided into four channels $C_1$, $C_2$, $C_3$, and $C_4$, each containing 750 Hz. Further each channel functions to pass one of two tones, thereby forming an FSK data transmitting means.

As an example, consider channel $C_2$ which lies between 1,000 Hz. and 1,750 Hz. The two tones representing marks and spaces are at frequencies 1,150 Hz. and 1,600 Hz., as shown in FIG. 2. It is to be noted that only one tone frequency will exist at any given time, representing either a mark or a space. Assume for example, that tone 0l of frequency 1,150 Hz. represents a mark and that such frequency is being received. The mixing of the center frequency of 1,375 Hz. with the tone frequency of 1,150 Hz. produces sum and difference frequencies, with the difference frequency being effectively translated to baseband as shown in FIG. 2d. More specifically the frequency $f_1t$ at 225 Hz. of FIG. 2d represents the translated tone 01 of the frequency spectrums of FIGS. 2a and 2b.

It is to be further noted that the spectrums of FIGS. 2a and 2b represent, respectively, first and second channels of the structure of FIG. 1. Thus each of the low pass filters 17 and 18 will have an output as shown in FIG. 2d, with the tone frequency being translated to the 225 Hz. value of $f_1t$. However, because of the 90° phase shift introduced by the reference signal in multipliers 11 and 12, the two baseband tones appearing at the output of filters 17 18 are in quadrature.

As discussed above, the two outputs of low pass filters 17 and 18 form the $x$ and $y$ components of a rotating vector and are supplied to the remainder of the circuit of FIG. 1 which performs the discriminator function thereon.

Because the frequency of tone 01 (which represents a mark) lies below the operating frequency $f_o$ of 1,375 Hz. the rotating vector will rotate in a first direction which, in accordance with expression 13, is negative or counterclockwise. If instead of a mark being received a space were received (represented by tone 02 at a frequency of 1,600 Hz.) the resultant rotating vector would be positive or clockwise in accordance with expression 13. However, the formation of the upper and lower sidebands would otherwise be much the same as in the case of a mark being received. More specifically the operating reference frequency of 1,375 Hz. will mix with the 1,600 Hz. frequency of tone 02 to provide sum and difference frequencies with the difference frequency being translated to baseband as shown in FIG. 2d. Again there are two such frequencies generated at baseband, one from the output of each of the low pass filters 17 and 18 of FIG. 1. The two frequencies $f_2t$ are in quadrature and are operated on by the remainder of the circuit of FIG. 1 to provide the discriminator function.

In a similar manner channels $C_1$, $C_3$, and $C_4$ can be employed in FSK operation. The essential difference is that for channels $C_1$, $C_3$, and $C_4$ a different reference frequency must be employed. For example, in channel $C_4$ which lies between frequencies of 2,500 Hz. and 3,250 Hz., the reference frequency $f_o$ will be 2,875 Hz. as shown in FIG. 2c.

It is to be understood that the form of the invention shown and described is but a preferred embodiment thereof and that various changes can be made in the logic arrangement without departing from the spirit or scope of the invention.

I claim:

1. Frequency discriminator means for detecting frequency variation of an input signal and comprising:

first and second signal paths each comprising in cascade arrangement:

first mixer means;

filter means;

differentiator means; and second mixer means;

means for supplying first and second reference signals in phase quadrature to said first mixer means of said first and second signal paths, respectively;

means for supplying said input signal to each of said first mixer means;

said first mixer means of said first and second signal paths responsive to said reference signal supplied thereto and to said input signal to produce the difference frequencies of said reference and input signals;

said filter means in each of said circuit paths constructed to pass said difference frequencies to the differentiator cascaded therewith;

means for supplying the output of each of said filter means to the second mixer means in the other signal path;

said second mixer means of each of said signal paths responsive to the output of the differentiator cascaded therewith and the output of the filter of the other signal path to produce, respectively, first and second output signals; and difference generating means responsive to said first and second output signals to produce a third output signal whose amplitude and polarity are indicative of the direction and the rate of change of the frequency of said input signal with respect to the frequency of said reference signal.

2. Frequency discriminator means for detecting frequency variation of an input signal from a nominal frequency $f_r$, and comprising:

first and second circuit paths each having first and second input means;

means for generating and supplying a first reference signal $q$ frequency $f_r$ to said first input means of said first circuit path, and a second reference signal in phase quadrature with said first reference signal to the first input means of said second circuit path;

means for supplying sald input signal to the second input means of said first and second circuit paths;

said first and second circuit paths each comprising in cascade arrangement:

means connected to said first and second input means for extracting the difference frequencies between said input signal and the applied reference signal;

means for differentiating the output of said extracting means; and means connected to said differentiating means and the extracting means of the other circuit path for mixing the output signals from the differentiating means cascaded therewith and the output of said extracting means from the other circuit means; and means for taking the difference between the output signals of the mixers of said first and second circuit means.

3. Frequency discriminator means for detecting frequency variation of an input signal and comprising:

first and second signal paths each comprising in cascade arrangement:

first mixer means;

filter means;

differentiator means; and second mixer means;

means for supplying said input signal to each of said first mixer means;

means for supplying first and second reference signals, in phase quadrature, to each of said first mixer means, respectively;

each of said first mixer means responsive to said reference signal supplied thereto and to said input signal to produce the difference frequencies of said reference and input signals;

said filter means in each of said signal paths constructed to pass said difference frequencies to the differentiator means in the same signal path;

each of said second mixer means responsive to the output signal of the differentiator in the same signal path and the output signal of the filter of the other signal path to produce, respectively, first and second product output signals; and difference amplifier means responsive to said first and second product output signals to produce a final output signal whose amplitude and polarity are indicative of the direction and rate of change of the frequency of said input signal with respect to the frequency of said reference signal.

4. A method of determining the relation between the frequency of an input signal and the frequency of a reference signal comprising the steps of:

producing first and second forms of said reference signal in phase quadrature;

producing difference frequencies between said input signal and said first and second forms of said reference signal, respectively;

extracting a first signal having components of the difference frequencies of said input signal and said first reference signal;

extracting a second signal having components of the difference frequencies of said input signal and said second reference signal;

differentiating said first and second extracted signals to produce first and second output signals, respectively;

multiplying said first extracted signal by said second output signal and said second extracted signal by said first output signal to produce third and fourth output signals; and taking the difference of said third and fourth output signals to provide a fifth output signal having characteristics which define the frequency relation between said input and reference signals.

5. A method of determining the relation between the frequency of an input signal and the frequency of a first reference signal comprising the steps of:

generating a second reference signal in phase quadrature with said first reference signal;

multiplying said input signal by said first reference signal to produce first signals of sum and difference frequencies;

multiplying said input signal by said second reference signal to produce second signals of sum and difference frequencies;

separately filtering said first and second signals to pass those signals of said difference frequencies only;

separately differentiating said fist and second signals of said difference frequencies;

multiplying the differentiated first and second signals by said second and first signals of said difference frequencies, respectively, to produce third and fourth signals; and taking the difference between said third and fourth signals.